(12) United States Patent
Hoshino et al.

(10) Patent No.: US 7,599,563 B2
(45) Date of Patent: Oct. 6, 2009

(54) DATA-TRANSCEIVING EQUIPMENT, IMAGE PROCESSOR, AND IMAGE-PROCESSING METHOD

(75) Inventors: Masashi Hoshino, Iizuka (JP); Takashi Hashimoto, Fukuoka (JP); Masayoshi Tojima, Kasuya-Gun (JP)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 10/541,371

(22) PCT Filed: Dec. 22, 2003

(86) PCT No.: PCT/JP03/16511

§ 371 (c)(1),
(2), (4) Date: Feb. 3, 2006

(87) PCT Pub. No.: WO2004/064392

PCT Pub. Date: Jul. 29, 2004

(65) Prior Publication Data

US 2006/0164545 A1    Jul. 27, 2006

(30) Foreign Application Priority Data

Jan. 14, 2003    (JP) .............................. 2003-005650

(51) Int. Cl.
*G06K 9/36* (2006.01)
(52) U.S. Cl. .................. 382/232; 382/234; 382/239
(58) Field of Classification Search .................. 382/232, 382/238; 348/432

See application file for complete search history.

(56) References Cited

U.S. PATENT DOCUMENTS

| | | | |
|---|---|---|---|
| 6,215,904 B1 * | 4/2001 | Lavallee | 382/234 |
| 6,553,145 B1 * | 4/2003 | Kang et al. | 382/239 |
| 6,622,004 B1 * | 9/2003 | Sonoda et al. | 455/3.05 |
| 7,050,113 B2 * | 5/2006 | Campisano et al. | 348/581 |
| 7,061,509 B2 * | 6/2006 | Dischert et al. | 345/629 |
| 7,106,861 B1 * | 9/2006 | Nishimura et al. | 380/200 |
| 7,486,297 B2 * | 2/2009 | Kouramanis et al. | 345/536 |
| 2002/0076207 A1 * | 6/2002 | Ando et al. | 386/95 |

FOREIGN PATENT DOCUMENTS

| | | |
|---|---|---|
| EP | 1 067 789 | 1/2001 |
| EP | 1 182 880 | 2/2002 |
| EP | 1182880 A2 * | 2/2002 |
| JP | 11-177977 | 7/1999 |
| JP | 2002-374508 | 12/2002 |

* cited by examiner

*Primary Examiner*—Samir A. Ahmed
*Assistant Examiner*—Mekonen Bekele
(74) *Attorney, Agent, or Firm*—Wenderoth, Lind & Ponack, L.L.P.

(57) ABSTRACT

An encoding unit (44) individually encodes display image-forming image data, i.e., image data from an image input unit (2), decoded data from a decoding unit (46), and graphics image data from a graphics-generating unit (47). A storing unit (45) stores the individually encoded image data. As a result, when a user intends to reuse, more specifically, replay, edit, or transmit the stored display image, the user can selectively decode required image elements, thereby reusing the selectively decoded image elements. This feature provides improved user-friendliness.

13 Claims, 5 Drawing Sheets

DATA-TRANSCEIVING EQUIPMENT, IMAGE PROCESSOR, AND IMAGE-PROCESSING METHOD

TECHNICAL FIELD

The present invention relates to data-transceiving equipment operable to communicate a moving image, and an art related thereto.

BACKGROUND ART

In order to record a video picture displayed on an image plane, a video camera or video recorder usually records a displayed video signal as such.

As disclosed in the published Japanese Patent Application No. 2002-94996, some pieces of recent data-transceiving equipment for displaying, and receiving multi-media data are designed to decode and then, blend several pieces of received encoded image data with each other, thereby displaying the resulting display image, while re-encoding and storing the display image.

This type of prior art data-transceiving equipment is now described in detail with reference to the drawings.

FIG. 5 is a block diagram illustrating the prior art data-transceiving equipment.

The data-transceiving equipment as illustrated in FIG. 5 includes a received data-separating unit 106, a decoding unit 104, a graphics-generating unit 105, an image-blending unit 103, an image-displaying unit 100, an encoding unit 101, a storing unit 102, and a control unit 107.

The received data-separating unit 106 separates received data, in which encoded image data is multiplexed with graphics data, into these two pieces of encoded image data and graphics image data.

The received data-separating unit 106 feeds the separated, encoded image data and the separated graphics data into the decoding unit 104 and the graphics-generating unit 105, respectively.

The decoding unit 104 decodes the encoded image data from the received data-separating unit 106. The decoding unit 104 feeds the decoded image data into the image-blending unit 103.

The graphics-generating unit 105 generates graphics image data based on the graphics data from the received data-separating unit 106. The graphics image data include texts, two-dimensional images, or three-dimensional images. The graphics-generating unit 105 feeds the generated graphics image data into the image-blending unit 103.

The image-blending unit 103 blends the image data from the decoding-unit 104 with the graphics image data from the graphics-generating unit 105, thereby producing display image data. The image-blending unit 103 feeds the display image data into the image-displaying unit 100.

The image-displaying unit 100 displays an image based on the display image data from the image-blending unit 103.

Upon receipt of instructions from the control unit 107 to record the displayed image, the image-displaying unit 100 transmits the display image data to the encoding unit 101.

The encoding unit 101 encodes the display image data from the image-displaying unit 100. The encoding unit 101 feeds the encoded display image data into the storing unit 102.

The storing unit 102 stores the encoded display image data from the encoding unit 101.

As described above, the prior art data-transceiving equipment is adapted to decode and then blends several pieces of received, encoded image data with each other to provide a display image, thereby displaying the display image, while re-encoding and storing the display image.

The decoding unit 104 retrieves the stored display image data from the storing unit 102 in response to instructions from the control unit 107 to replay the display image. The decoding unit 104 decodes the retrieved display image data.

The decoded display image data is fed into the image-displaying unit 100 through the image-blending unit 103. The image-displaying unit 100 displays an image based on the decoded display image data.

In recent years, the use of the data-transceiving equipment as described above has resulted in an increasing number of data-transceiving equipment with a moving image-communicating function such as a videophone function. More specifically, such functional data-transceiving equipment is designed to display a blended image on the image-displaying unit 100 as well as displaying, on the image-displaying unit 100, only an image obtained by decoding the received encoded image data. The blended image includes a received image, an image taken into the data-transceiving equipment through a camera on the data-transceiving equipment, and a generated graphics image from the graphics-generating unit 105.

For example, assume that a first user having one videophone-equipped handset communicates with a second user having another videophone-equipped handset. In the first user's videophone-equipped handset, a main image formed by a decoded image of primarily the second user from, the second user's videophone-equipped handset is blended with several sub-images that include a first user's self-portrait and a graphics image. The first user's self-portrait is entered into the first user's videophone-equipped handset through a built-in camera on the first user's videophone-equipped handset. The graphics image is generated in the first user's videophone-equipped handset. As a result, such a blended image is displayed as a display image on the image-displaying unit 100.

The blended display image is not always used as such because of possible reuse thereof. More specifically, the blended display image may be once recorded. Then later the recorded display image may be replayed, edited, and transmitted.

For example, when the first user and the second user communicate with one another using the videophone-equipped handsets, the first user may want to watch only a second user's image, first and second user's images, or only a graphics image. Further variations in image may be considered.

As a result, when the data-transceiving equipment including the prior art data-transceiving equipment stores and encodes ultimate display images, there objectionably occurs image loss caused by an overlap of blended images. In addition, some necessary part of the blended images must disadvantageously be taken out therefrom.

A problem with the prior art data-transceiving equipment is, that it is difficult to meet such requirements, with a concomitant decrease in user-friendliness.

DISCLOSURE OF THE INVENTION

In view of the above, an object of the present invention is to provide data-transceiving equipment free to edit a display image formed by blended images to provide improved user-friendliness, and an art related thereto.

A first aspect of the present invention provides data-transceiving equipment comprising: a received data-separating unit operable to separate received data into two different pieces of encoded data and graphics data, thereby providing the encoded data and the graphics data, when the received data includes the encoded data and the graphics data, and the received data-separating unit being operable to provide the encoded data when the received data includes the encoded data, but not the graphics data; a decoding unit operable to decode the encoded data from the received data-separating unit, thereby providing decoded data; a graphics-generating unit operable to generate graphics image data based on the graphics data from the received data-separating unit, thereby providing the graphics image data; an image input unit operable to enter image data; an image-blending unit operable to blend a plurality of images with one another to provide blended image data, the plurality of images being represented by at least two pieces of data selected from among the decoded data from the decoding unit, the graphics image data from the graphics-generating unit, and the image data from the image input unit; an image-displaying unit operable to display a blended image based on the blended image data from the image-blending unit; an encoding unit operable to individually encode the image data from the image input unit, the decoded data from the decoding unit, and the graphics image data from the graphics-generating unit; and a storing unit operable to store the encoded image data, the encoded decoded data, and the encoded graphics image data.

The above system individually encodes and stores display image (blended image)-forming data, i.e., the image data from the image input unit, the decoded data from the decoding unit, and the graphics image data from the graphics-generating unit.

This feature allows a user, to selectively decode required image elements, thereby reusing the selectively decoded image elements, when the user needs to reuse, more specifically, replay, edit, or transmit the stored display image (blended image).

As a result, improved user-friendliness is achievable.

A second aspect of the present invention provides data-transceiving equipment comprising: a received data-separating unit operable to separate received data into two different pieces of encoded data and graphics data, thereby providing the encoded data and the graphics data, when the received data includes the encoded data and the graphics data, and the received data-separating unit being operable to provide the encoded data when the received data includes the encoded data, but not the graphics data; a decoding unit operable to decode the encoded data from the received data-separating unit, thereby providing decoded data; a graphics-generating unit operable to generate graphics image data based on the graphics data from the received data-separating unit, thereby providing the graphics image data; an image input unit operable to enter image data; an image-blending unit operable to blend a plurality of images with one another to provide blended image data, the plurality of images being represented by at least two pieces of data selected from among the decoded data from the decoding unit, the graphics image data from the graphics-generating unit, and the image data from the image input unit; an image-displaying unit operable to display a blended image based on the blended image data from the image-blending unit; an encoding unit operable to individually encode the image data from the image input unit and the decoded data, from the decoding unit, thereby providing encoded data; a multiplexing unit operable to multiplex the encoded data from the encoding unit with the graphics data from the received data-separating unit, thereby providing multiplexed data; and a storing unit operable to store the multiplexed data from the multiplexing unit; and a stored data-separating unit operable to separate the multiplexed data from the storing unit into two different pieces of the encoded data and the graphics data, thereby providing the encoded data and the graphics data separately.

The above system individually encodes and stores display image (blended image)-forming data, i.e., the image data from the image input unit and the decoded data from the decoding unit. Meanwhile, as to a graphics image that forms part of a display image (blended image), the above system stores graphics data required to create the graphics image.

This feature allows a user to select required image elements to decode the stored display image (blended image) or to generate the graphics image, thereby reusing the stored display image (blended image) and the graphics image, when the user needs to reuse or rather replay, edit, or transmit the stored display image (blended image).

As a result, improved user-friendliness is achievable.

As described above, the above system does not store the graphics image data, but stores the graphics data that underlies the graphics image data. This feature requires a smaller volume of storage capacity, and records long video. As a result, the storing unit is usable in a highly efficient manner.

A third aspect of the present invention provides data-transceiving equipment, further comprising: a control unit, wherein, as to a graphics image, a first mode allows the storing unit to store the graphics data that underlies the graphics image, wherein, as to, the graphics image, a second mode allows the storing unit to store the encoded graphics image data from the encoding unit, and wherein a switchover between the first and second modes is realized in accordance with instructions from the control unit.

As to the graphics image that forms part of the display image (blended image), the above system can select either the encoding and storage of the graphics image data or the storage of the graphics data required to produce the graphics image.

This feature makes it feasible to select a pattern of graphics image-related storage in dependence upon situations, with ensuing improvements in user-friendliness.

For example, when the display image including the graphics image is transmitted to a receiving terminal without the graphics-generating unit, the graphics image data from the graphics-generating unit is encoded by the encoding unit before being transmitted to the receiving terminal, in order to allow the receiving terminal to replay the transmitted display image. Thus, a pattern of graphics image-related storage is selectable, depending upon situations.

A fourth aspect of the present invention provides data-transceiving equipment comprising: a received data-separating unit operable to separate received data into two different pieces of encoded data and graphics data, thereby providing the encoded data and the graphics data, when the received data includes the encoded data and the graphics data, and the received data-separating unit being operable to provide the encoded data when the received data includes the encoded data, but not the graphics data; a decoding unit operable to decode the encoded data from the received data-separating unit, thereby providing decoded data; a graphics-generating unit operable to generate graphics image data based on the graphics data from the received data-separating unit, thereby providing the graphics image data; an image input unit operable to enter image data; an image-blending unit operable to blend a plurality of images with one another to provide blended image data, the plurality of images being represented by at least two pieces of data selected from among the decoded data from the decoding unit, the graphics image data from the graphics-generating unit, and the image data from the image input unit; an image-displaying unit operable to display a blended image based on the blended image data from the image-blending unit; a selecting unit operable to select, in response to a control signal, data from among the decoded data from the decoding unit, the graphics image data from the graphics-generating unit, and the image data from the image input unit, thereby providing the selected data; an encoding unit operable to encode the selected data from the selecting unit, thereby providing encoded data; and a storing unit operable to store the encoded data from the encoding unit, wherein the encoding unit individually encodes two or greater pieces of data selected by the selecting unit when the selecting unit selects the two or greater pieces of data.

The above system individually encodes and stores image data selected by the selecting unit from among display image (blended image)-forming data, i.e., the image data from the image input unit, the decoded data from the decoding unit, and the graphics image data from the graphics-generating unit.

This feature allows a user to selectively decode required image elements, thereby reusing the selectively decoded image elements, when the user needs to reuse, more specifically, replay, edit, or transmit the stored display image (blended image).

As a result, improved user-friendliness is achievable.

The use of the selecting unit makes it feasible to establish a pattern of storing the display image (blended image) in accordance with user's preference and the vacant capacity of the storing unit.

The use of the selecting unit makes it feasible to store only required image data. This feature realizes highly efficient use of the storing unit (e.g., long video recording).

A fifth aspect of the present invention provides data-transceiving equipment comprising: a received data-separating unit operable to separate received data into two different pieces of encoded data and graphics data, thereby providing the encoded data and the graphics data, when the received data includes the encoded data and the graphics data, and the received data-separating unit being operable to provide the encoded data when the received data includes the encoded data, but not, the graphics data; a decoding unit operable to decode the encoded data from the received data-separating unit, thereby providing decoded data; a graphics-generating unit operable to generate graphics image data based on the graphics data from the received data-separating unit, thereby providing the graphics image data; an image input unit operable to enter image data; an image-blending unit operable to blend a plurality of images with one another to provide blended image data, the plurality of images being represented by at least two pieces of data selected from among the decoded data from the decoding unit, the graphics image data from the graphics-generating unit, and the image data from the image input unit; an image-displaying unit operable to display a blended image based on the blended image data from the image-blending unit; a selecting unit operable to select, in response to a control signal, data from among the decoded data from the decoding unit, the graphics image data from the graphics-generating unit, and the image data from the image input unit, thereby providing the selected data; an encoding unit operable to encode the selected data from the selecting unit, thereby providing encoded data; a multiplexing unit operable to multiplex the graphics data with the encoded data from the encoding unit upon receipt of the graphics data from the received data-separating unit, thereby providing multiplexed data; a storing unit operable to store the multiplexed data upon receipt of the multiplexed data from the multiplexing unit, but operable to store the encoded data upon receipt of the encoded data from the encoding unit; and a stored data-separating unit operable to separate the multiplexed data from the storing unit into two different pieces of the encoded data and the graphics data, thereby providing the encoded data and the graphics data separately, wherein the encoding unit individually encodes two or greater pieces of data selected by the selecting unit when the selecting unit selects the two or greater pieces of data.

The above system individually encodes and stores image data selected by the selecting unit from among display image (blended image)-forming data, i.e., the image data from the image input unit, the decoded data from the decoding unit, and the graphics image data from the graphics-generating unit.

Alternatively, the above system individually encodes and stores display image (blended image)-forming data, i.e., the image data from the image input unit and the decoded data from the decoding unit. Meanwhile, as to a graphics image that forms part of a display image (blended image), the above system stores graphics data required to, create the graphics image.

This feature allows a user to select required image elements to decode the stored display image (blended image) or to generate the graphics image, thereby reusing the stored display image (blended image) and the graphics image, when the user needs to reuse, more specifically, replay, edit, or transmit the stored display image (blended image).

As a result, improved user-friendliness is achievable.

The use of the selecting unit makes it feasible to establish a pattern of storing the display image (blended image) in accordance with user's preference and the vacant capacity of the storing unit.

The use of the selecting unit makes it feasible to store only required image data. This feature realizes highly efficient use of the storing unit (e.g., long video recording).

When not storing the graphics image data, but storing the graphics data that underlies the graphics image data, the above system requires a smaller volume of storage capacity, and records long video. As a result, the storing unit is usable in a highly efficient manner.

A sixth aspect of the present invention provides data-transceiving equipment, further comprising: a control unit, wherein, as to a graphics image, a first mode allows the storing unit to store the encoded graphics image data from the encoding unit, wherein, as to the graphics image, a second mode allows the storing unit to store the graphics data that underlies the graphics image, and wherein a switchover between the first and second modes is realized in accordance with instructions from the control unit.

As to the graphics image that form part of the display image (blended image), the above system can select either the encoding and storage of the graphics image data or the storage of the graphics data required to produce the graphics image.

This feature makes it feasible to select a pattern of graphics image-related storage in dependence upon situations, with ensuing improvements in user-friendliness.

For example, when the display image including the graphics image is transmitted to a receiving terminal without the graphics-generating unit, the graphics image data from the graphics-generating unit is encoded by the encoding unit before being transmitted to the receiving terminal, in order to allow the receiving terminal to replay the transmitted display image. In this way, a pattern of graphics image-related storage is selectable, depending upon situations.

A seventh aspect of the present invention provides data-transceiving equipment, wherein the second mode allows or disallows the receiving data-separating unit to enter the graphics data into the multiplexing unit in response to instructions from the control unit.

In the second mode, not only the above system can select the image data from the image input unit and the decoded data from the decoding unit, but also the above system can select whether to store the graphics data or not. This feature provides improved user-friendliness.

An eighth aspect of the present invention provides data-transceiving equipment, further comprising: a control unit, wherein the storing unit stores image data specified by the control unit from among the image data from the image input unit, the decoded data from the decoding unit, and graphics-related data (graphics image data and graphics data), and wherein the storing unit stores data specified by the control unit from between the graphics image data from the graphics-generating unit and the graphics data from the separated data-separating unit when the storing unit stores the graphics-related data.

The above system is possible to select whether the graphics-related data is stored, and further to select which one is stored between the graphics image data and the graphics data.

This feature provides further improved user-friendliness, and further highly efficient use of the storing unit.

A ninth aspect of the present invention provides data-transceiving equipment, wherein the storing unit stores data related to the blended image displayed on the image-displaying unit.

The above system stores the display image (blended image) including data related thereto. This feature can aid a user in searching the stored display image (blended image) when the user reuses the stored display image (blended image). As a result, further improved user-friendliness is attainable.

A tenth aspect of the present invention provides an image processor comprising: a received data-separating unit operable to separate received data into two different pieces of encoded data and graphics data, thereby providing the encoded data and the graphics data, when the received data includes the encoded data and the graphics data, and the received data-separating unit being operable to provide the encoded data when the received data includes the encoded data, but not the graphics data; a decoding unit operable to decode the encoded data from the received data-separating unit, thereby providing decoded data; a graphics-generating unit operable to generate graphics image data based on the graphics data from the received data-separating unit, thereby providing the graphics image data; an image-blending unit operable to blend a plurality of images with one another to provide blended image data, the plurality of images being represented by at least two pieces of data selected from among the decoded data from the decoding unit, the graphics image data from the graphics-generating unit, and image data from the outside of the image processor; an encoding unit operable to individually encode the image data from the outside of the image processor, the decoded data from the decoding unit, and the graphics image data from the graphics-generating unit; and a storing unit operable to store the encoded image data from the outside of the image processor, the encoded decoded data, and the encoded graphics image data.

The above system individually encodes and stores blended image-forming data, i.e., the image data from the outside of the image processor, the decoded data from the decoding unit, and the graphics image data from the graphics-generating unit.

This feature allows a user to selectively decode required image elements, thereby reusing the selectively decoded image elements, when the user needs to reuse, more specifically, replay, edit, or transmit the stored blended image.

As a result, improved user-friendliness is achievable.

An eleventh aspect of the present invention provides an image processor comprising: a received data-separating unit operable to separate received data into two different pieces of encoded data and graphics data, thereby providing the encoded data and the graphics data, when the received data includes the encoded data and the graphics data, and the received data-separating unit being operable to provide the encoded data when the received data includes the encoded data, but not the graphics data; a decoding unit operable to decode the encoded data from the received data-separating unit, thereby providing decoded data; a graphics-generating unit operable to generate graphics image data based on the graphics data from the received data-separating unit, thereby providing the graphics image data; an image-blending unit operable to blend a plurality of images with one another to provide blended image data, the plurality of images being represented by at least two pieces of data selected from among the decoded data from the decoding unit, the graphics image data from the graphics-generating unit, and image data from the outside of the image processor; an encoding unit operable to individually encode the image data from the outside of the image processor and the decoded data from the decoding unit, thereby providing encoded data; a multiplexing unit operable to multiplex the encoded data from the encoding unit with the graphics data from the received data-separating unit, thereby providing multiplexed data; a storing unit operable to store the multiplexed data from the multiplexing unit; and a stored data-separating unit operable to separate the multiplexed data from the storing unit into two different pieces of the encoded data and the graphics data, thereby providing the encoded data and the graphics data separately.

The above system individually encodes and stores blended image-forming data, i.e., the image data from the outside of the image processor and the decoded data from the decoding unit. Meanwhile, as to a graphics image that forms part of a blended image, the above system stores graphics data required to create the graphics image.

This feature allows a user to select required image elements to decode the stored blended image or to generate the graphics image, thereby reusing the stored blended image and the graphics image, when the user needs to reuse, more specifically, replay, edit, or transmit the stored blended image.

As a result, improved user-friendliness is achievable.

As described above, the above system does not store the graphics image data, but stores the graphics data that underlies the graphics image data. This feature requires a smaller volume of storage capacity, and records long video. In this way, the storing unit is usable in a highly efficient manner.

A twelfth aspect of the present invention provides an image processor comprising: a received data-separating unit operable to separate received data into two different pieces of encoded data and graphics data, thereby providing the encoded data and the graphics data, when the received data includes the encoded data and the graphics data, and the received data-separating unit being operable to provide the encoded data when the received data includes the encoded data, but not the graphics data; a decoding unit operable to decode the encoded data from the received data-separating unit, thereby providing decoded data; a graphics-generating unit operable to generate graphics image data based on the graphics data from the received data-separating unit, thereby providing the graphics image data; an image-blending unit operable to blend a plurality of images with one another to provide blended image data, the plurality of images being represented by at least two pieces of data selected from among the decoded data from the decoding unit, the graphics image data from the graphics-generating unit, and image data from the outside of the image, processor; a selecting unit operable to select, in response to a control signal, data from among the decoded data from the decoding unit, the graphics image data from the graphics-generating unit, and the image data from the outside of the image processor, thereby providing the selected data; an encoding unit operable to encode the selected data from the selecting unit, thereby providing encoded data; and a storing unit operable to store the encoded data from the encoding unit, wherein the encoding unit individually encodes two or greater pieces of data selected by the selecting unit when the selecting unit selects the two or greater pieces of data.

The above system individually encodes and stores image data selected by the selecting unit from among blended image-forming data, i.e., the image data from the outside of the image processor, the decoded data from the decoding unit, and the graphics image data from the graphics-generating unit.

This feature allows a user to selectively decode required image elements, thereby reusing the selectively decoded image elements, when the user needs to reuse, more specifically, replay, edit, or transmit the stored blended image.

As a result, improved user-friendliness is achievable.

The use of the selecting unit makes it feasible to establish a pattern of storing the blended image in accordance with user's preference and the vacant capacity of the storing unit.

The use of the selecting unit makes it feasible to store only required image data. This feature realizes highly efficient use of the storing unit (e.g., long video recording).

A thirteenth aspect of the present invention provides an image processor: a received data-separating unit operable to separate received data into two different pieces of encoded data and graphics data, thereby providing the encoded data and the graphics data, when the received data includes the encoded data and the graphics data, and the received data-separating unit being operable to provide the encoded data when the received data includes the encoded data, but not the graphics data; a decoding unit operable to decode the encoded data from the received data-separating unit, thereby providing decoded data; a graphics-generating unit operable to generate graphics image data based on the graphics data from the received data-separating unit, thereby providing the graphics image data; an image-blending unit operable to blend a plurality of images with one another to provide blended image data, the plurality of images being represented by at least two pieces of data selected from among the decoded data from the decoding unit, the graphics image data from the graphics-generating unit, and image data from the outside of the image processor; a selecting unit operable to select, in response to a control signal, data from among the decoded data from the decoding unit, the graphics image data from the graphics-generating unit, and the image data from the outside of the image processor, thereby providing the selected data; an encoding unit operable to encode the selected data from the selecting unit, thereby providing encoded data; a multiplexing unit operable to multiplex the graphics data with the encoded data from the encoding unit upon receipt of the graphics data from the received data-separating unit, thereby providing multiplexed data; a storing unit operable to store the multiplexed data upon receipt of the multiplexed data from the multiplexing unit, but operable to store the encoded data upon receipt of the encoded data from the encoding unit; and a stored data-separating unit operable to separate the multiplexed data from the storing unit into two different pieces of the encoded data and the graphics data, thereby providing the encoded data and the graphics data separately, wherein the encoding unit individually encodes two or greater pieces of data selected by the selecting unit when the selecting unit selects the two or greater pieces of data.

The above system individually encodes and stores image data selected by the selecting unit from among blended image-forming data, i.e., the image data, from the outside of the image processor, the decoded data from the decoding unit, and the graphics image data from the graphics-generating unit.

Alternatively, the above system individually encodes and stores blended image-forming data, i.e., the image data from the outside of the image processor and the decoded data from the decoding unit. Meanwhile, as to a graphics image that forms part of a blended image, the above system stores graphics data required to create the graphics image.

This feature allows a user to select required image elements to decode the stored blended image or to generate the graphics image, thereby reusing the stored blended image and the graphics image, when the user needs to reuse, more specifically, replay, edit, or transmit the stored blended image.

As a result, improved user-friendliness is achievable.

The use of the selecting unit makes it feasible to establish a pattern of storing the blended image in accordance with user's preference and the vacant capacity of the storing unit.

The use of the selecting unit makes it feasible to store only required image data. This feature realizes highly efficient use of the storing unit (e.g., long video recording).

When not storing the graphics image data, but storing the graphics data that underlies the graphics image data, the above system requires a smaller volume of storage capacity, and records long video. In this way, the storing unit is usable in a highly efficient manner.

A fourteenth aspect of the present invention provides an image processor comprising: a decoding unit operable to decode entered encoded data, thereby producing decoded data; an encoding unit operable to individually encode entering image data and the decoded data; and a storing unit operable to store the individually encoded image data and the individually encoded decoded data.

The above system individually encodes and stores the entering image data and the decoded data.

This feature allows a user to selectively decode required image elements, thereby reusing the selectively decoded image elements, when the user needs to reuse, more specifically, replay, edit, or transmit the stored image.

As a result, improved user-friendliness is achievable.

The term "entered image data" as discussed in the fourteenth aspect of the present invention may include graphics image data.

A fifteenth aspect of the present invention provides an image-processing method comprising: decoding entered encoded data, thereby producing decoded data; individually encoding entered image data and the decoded data; and storing the individually encoded image data and the individually encoded decoded data.

The above method individually encodes and stores the entered image data and the decoded data.

This feature allows a user to selectively decode required image elements, thereby reusing the selectively decoded image elements, when the user needs to reuse, more specifically, replay, edit, or transmit the stored image.

As a result, improved user-friendliness is achievable.

The term "entered image data" as discussed in the fifteenth aspect of the present invention may include graphics image data.

The above, and other objects, features and advantages of the present invention will become apparent from the following description read in conjunction with the accompanying drawings, in which like reference numerals designate the same components.

BEST MODE FOR CARRYING OUT THE INVENTION

Embodiments of the present invention are now described with reference to the accompanying drawings. The embodiments illustrate a videophone-equipped handset as data-transceiving equipment.

First Embodiment

Figure 1:
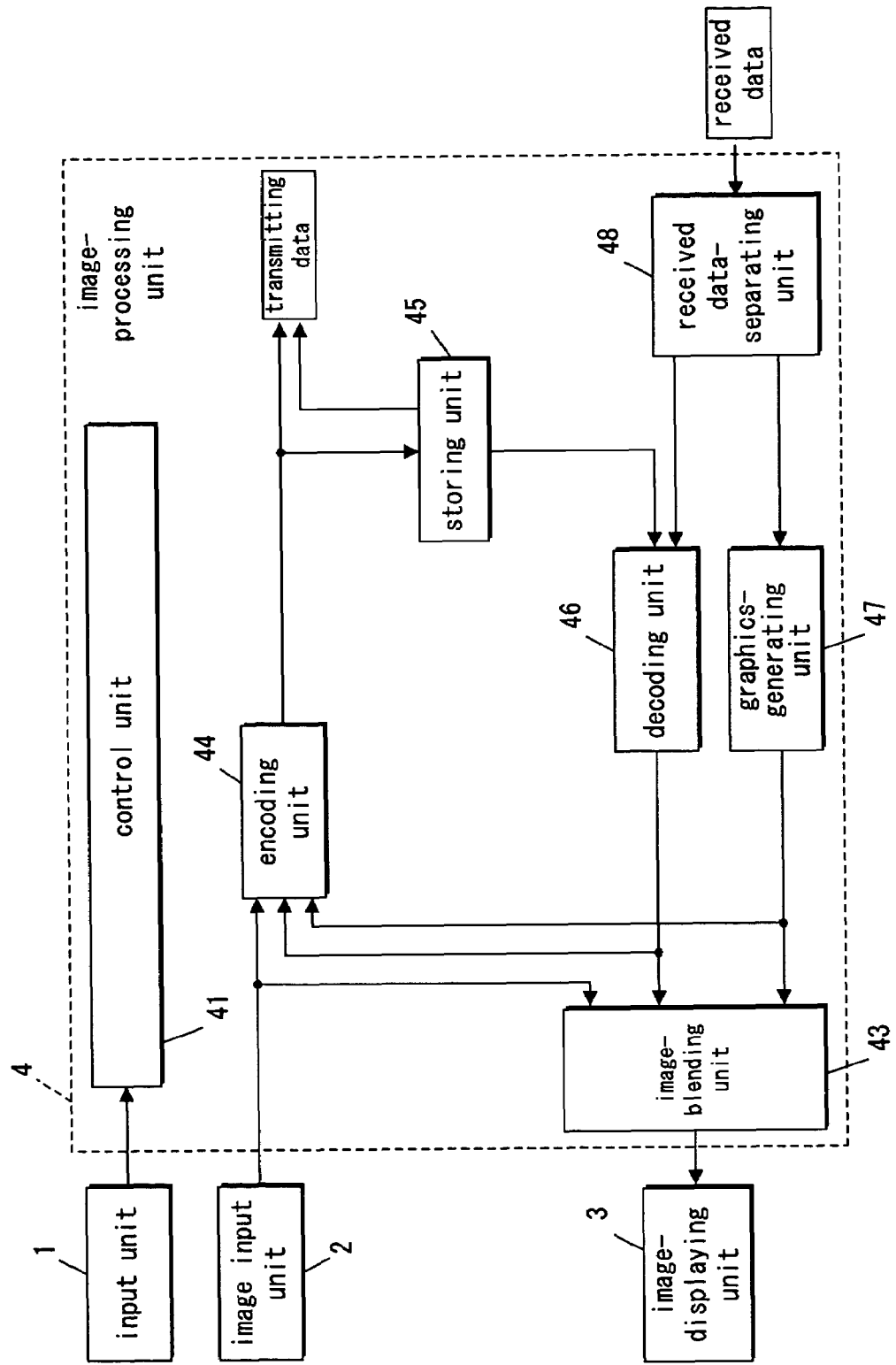
FIG. 1 is a block diagram illustrating data-transceiving equipment according to a first embodiment of the present invention.

FIG. 1 is a block diagram illustrating data-transceiving equipment according to a first embodiment of the present invention.

The data-transceiving equipment of FIG. 1 includes an input unit 1, an image input unit 2, an image-displaying unit 3, and an image-processing unit 4.

The image-processing unit 4 includes a control unit 41, an image-blending unit 43, an encoding unit 44, a storing unit 45, a decoding unit 46, a graphics-generating unit 47, and a received data-separating unit 48.

The input unit 1 feeds instructions from a user as an electrical signal into the control unit 41. The input unit 1 may be formed with, e.g., an array of keys.

The image input unit 2 generates digital image data. The image input unit 2 feeds the generated digital image data as input image data into the encoding unit 44 and image-blending unit 43.

The image input unit 2 can be, e.g., an image pickup device such as a CCD (charge coupled device) camera, or an analog-digital converter operable to convert an analog TV signal into a digital signal. The analog-digital converter can be, e.g., a NTSC (national television system committee) decoder or a PAL (phase alternation by line) decoder.

The encoding unit 44 individually encodes respective pieces of image data of images from the decoding unit 46, the graphics-generating unit 47, and the image input unit 2. Details of such an encoding step are discussed later.

The encoding unit 44 transmits the encoded image data to the outside of the data-transceiving equipment.

Alternatively, the encoding unit 44 feeds the encoded image data into the storing unit 45.

In the encoding of moving image data, the encoding unit 44 is able to individually encode data defined as objects having any shapes in a frame image and a field image as well as data having rectangular shapes such as the frame image and field image.

When encoding the moving image data, the encoding unit 44 is able to form a single image selected from several rectangular moving images or several objects having any shapes.

The encoding unit 44 copes with, e.g., an image compressing and expanding system of MPEG (moving picture exports group)-4.

The storing unit 45 stores the encoded image data from the encoding unit 44 in response to instructions from the control unit 41 to record a display image.

The storing unit 45 can be, e.g., a semi-conductor memory such as a flash memory or a DRAM (dynamic random access memory), or alternatively a data recorder such as a memory card.

When receiving multiplexed data as received data from the outside of the data-transceiving equipment, the received data-separating unit 48 separates the multiplexed data into two different pieces of encoded image data and graphics data.

The received data-separating unit 48 feeds the separated, encoded image data and the separated graphics data into the decoding unit 46 and the graphics-generating unit 47, respectively.

When receiving non-multiplexed data as received data from the outside of the data-transceiving equipment, the received data-separating unit 48 feeds the received data or the encoded image data into the decoding unit 46.

The decoding unit 46 decodes the encoded image data from the received data-separating unit 48 as well as the encoded image data from the storing unit 45.

Similar to the encoding unit 44, the decoding unit 46 accommodates an image compressing and expanding system that allows for the decoding per object. For example, the decoding unit 46 works with the image compressing and expanding system of MPEG-4.

Assume that encoded image data encoded by the image compressing and expanding system and formed by plural objects enters the decoding unit 46. In this instance, the decoding unit 46 initially separates such multiplexed, encoded object image data into each piece of encoded object image data.

Subsequently, the decoding unit 46 decodes each piece of the separated, encoded object image data.

Assume that encoded image data encoded by the image compressing and expanding system, but non-multiplexed by plural objects enters the decoding unit 46. In this instance, the decoding unit 46 decodes the entering encoded image data as such.

The graphics-generating unit 47 generates graphics image data based on the entered graphics data.

The graphics data as just discussed includes two different pieces of graphics data. One of them enters the graphics-generating unit 47 through the control unit 41 after having been generated in the data-transceiving equipment. The other enters the graphics-generating unit 47 through the received data-separating unit 48 after having been received into the data-transceiving equipment from the outside of the data-transceiving equipment.

The image-blending unit 43 blends respective pieces of image data from the decoding unit 46, the graphics-generating unit 47, and the image input unit 2 with each other, thereby producing display image data (blended image data). The image-blending unit 43 feeds the resulting display image data (blended image data) into the image-displaying unit 3.

More specifically, the image-blending unit 43 enlarges, downsizes, and filters the respective pieces of entering image data in response to display image combination instruction data from the control unit 41, thereby blending the respective pieces of image data with each other in accordance with a display position and overlaying sequence of each specified one of the images. As a result, the display, image data (blended image data) is produced.

The display image combination instruction data includes information to specify the way of blending several images with each other.

The image-displaying unit 3 displays an image thereon based on the display image data (blended image data) from the image-blending unit 43. The image-displaying unit 3 can be a display unit such as, e.g., a display.

The control unit 41 controls each component in the image-processing unit 4.

The following discusses behaviors during a videophone mode.

A transmitting step is now described.

The image input unit 2 photographs a photographic subject, thereby entering a first user's image, primarily an image made of a self-portrait, into the image-processing unit 4.

The encoding unit 44 encodes the entered first user's image from the image input unit 2, thereby providing encoded image data. The encoding unit 44 transmits the encoded image data to second user's data-transceiving equipment.

A receiving step is now described.

When received data from the second user's data-transceiving equipment comprises encoded image data multiplexed with graphics data, then the received data-separating unit 48 separates the encoded image data from the graphics data before bringing the received data to the next step.

When the received data from the second user's data-transceiving equipment includes the encoded image data, not including the graphics data, then the received data-separating unit 48 feeds the encoded image data as such into the decoding unit 46.

The encoded image data as discussed above has an encoded second user's image, primarily an image made of a second user's portrait.

The decoding unit 46 decodes the encoded image data from the received data-separating unit 48.

The graphics-generating unit 47 produces a graphics image based on either the graphics data from the received data-separating unit or graphics data that is sent to the graphics-generating unit 47 through the control unit 41 after having been generated in the data-transceiving equipment.

The graphics image originates from the graphics data.

The graphics data from the second user's data-transceiving equipment can be data that underlies a graphics image decorating a message text or the second user's image, received from the second user. The graphics image is displayed with the second user's image.

The graphics data from the control unit 41 can be data that underlies the following: icons or characters; texts such as date, time, and menus; and, a graphics image such as animation. These graphics function as a user interface.

In the present description, images derived from the graphics data shall broadly be called a graphics image.

The image-blending unit 43 treats three different types of images as discussed below in accordance with the display image combination instruction data from the control unit 41 in order to create a display image. The three different types of images as discussed above includes the first user's image from the image input unit 2, the second user's image from the decoding unit 46, and a variety of graphics images from the graphics-generating unit 47.

The treatment required to create the display image includes, e.g., the enlarging and downsizing of the images as well as the filtering of the images.

The image-blending unit 43 blends the treated images with each other in accordance with a positional relationship between the treated images in the display image as specified by the display image combination instruction data. In this way, the display image is provided.

The image-displaying unit 3 displays the above-described display image thereon.

The above discusses the behaviors during the videophone mode.

An image-recording step is now described.

When the first user feeds instructions into the control unit 41 using the input unit 41 during the videophone mode to record a display image displayed on the image-displaying unit 3, then the control unit 41 creates a control signal to record the display image.

When the control unit 41 feeds the control signal into the encoding unit 44 to record the display image, then the encoding unit 44 encodes the display image in addition to encoding of an input image from the image input unit 2 to transmit the encoded input image as transmitting data to the outside of the first user's data-transceiving equipment.

To encode the display image, the encoding unit 44 individually encodes display image-forming image elements from the image input unit 2, the decoding unit 46, and the graphics-generating unit 47. The encoding unit 44 multiplexes the encoded image elements with each other, thereby providing a piece of encoded image data.

In the multiplexing step as discussed above, header information as well as the display image combination instruction data (which enters the image-blending unit 43 from the control unit 41) is added to the encoded image data. As a result, encoded data of object images are multiplexed with encoded data of graphics images.

The storing unit 45 stores the multiplexed data (the encoded image data of the display image) as described above.

The header information as given above includes a list of the object images and graphics images to be multiplexed (herein called a "multiplexed image list"), and information on a synchronizing signal indicative of timing to replay the object images and graphics images.

The following discusses a step of replaying the stored display image in the storing unit 45.

To replay the display image recorded in the storing unit 45, the storing unit 45 feeds relevant encoded image data into the decoding unit 46.

The decoding unit 46 separates the multiplexed header information and display image combination instruction data from the encoded image data.

The control unit 41 analyzes the separated header information to feed, into the image-blending unit 43, results from the analysis of the multiplexed image list as well as the analysis of the information on the synchronizing signal indicative of timing to replay the object images and graphics images.

The control unit 41 feeds the separated display image combination instruction data into the image-blending unit 43.

The image-blending unit 43 detects display image-forming images based on the multiplexed image list, thereby allowing a list of the display image-forming images to be displayed on the image-displaying unit 3.

As a result, the user can recognize images that form the display image.

Assume that the user selects, from the list displayed on the image-displaying unit 3, an image to be displayed at this time. When the user enters such selection information into the control unit 41 using the input unit 1, then the control unit 41 feeds a control signal into the decoding unit 46 to specify an image to be decoded (i.e., an image designated by the selection information).

The decoding unit 46 decodes only the image specified by the control signal, and then feeds the decoded image into the image-blending unit 43.

At this time, the decoding unit 46 also feeds the separated display image combination instruction data into the image-blending unit 43.

The image-blending unit 43 processes the decoded image from the decoding unit 46 based on the display image combination instruction data from the decoding unit 46. As a result, the image-blending unit 43 provides a new display image.

The image-displaying unit 3 displays the new display image thereon.

The following discusses a step of editing or processing the stored display image in the storing unit 45.

Similar to the replaying step as described above, an image selected by the user from images that form the stored display image is displayed on the image-displaying unit 3.

As a result, the user can edit and process the displayed image by manipulating the input unit 1 while watching the image-displaying unit 3. For example, the user can add a user's favorite graphics image to the displayed image, or can change display positions and sizes of the images that form the display image.

To add the user's favorite graphics image to the displayed image, the control unit 41 enters two different elements as given below into the graphics-generating unit 47 upon receipt of instructions from the user through the input unit 1. The two different elements as given above include graphics data that underlies the graphics image to be added, and instructions to generate the graphics image.

The graphics-generating unit 47 in receipt of the instructions from the control unit 41 creates the graphics image based on the entered graphics data. The graphics-generating unit 47 feeds the created graphics image into the image-blending unit 43.

The image-blending unit 43 blends the fed graphics image with an image to be processed, in response to the instructions from the control unit 41, thereby providing a processed display image.

The processed displayed image is displayed on the image-displaying unit 3.

To change the display positions and sizes of the images that form the display image, the control unit 41 in receipt of instructions from the user through the input unit 1 feeds a control signal into the image-blending unit 43 to change the display positions or sizes as discussed above.

The image-blending unit 43 changes the display positions or sizes in response to the control signal, thereby providing a processed display image.

The processed display image is displayed on the image-displaying unit 3.

As an example of editing or processing the stored display image, only a second user's image may be selected from the stored display image to display the selected second user's image; a graphics image having a certain display frame (e.g., a display frame with a floral pattern) may be added to the displayed second user's image.

As described above, pursuant to the present embodiment, display image (blended image)-forming data, i.e., the image data from the image input unit 2 the decoded data from the decoding unit 46, and the graphics image data from the graphics-generating unit 47 are encoded individually, with the result that the individually encoded data are stored in the storing unit 45.

As a result, when the user needs to reuse, more specifically, replay, edit, or transmit the stored display image (blended image), the user is free to selectively decode required image elements, thereby reusing the selectively decoded image elements.

This feature provides improved user-friendliness.

According to the present embodiment, when the display image is stored in the storing unit 45 during the videophone mode, information on the display image to be stored can be stored as well.

Such display image-related information can be a piece of information on the second user who communicates with the first user during the videophone mode. For example, a name of the second user, a telephone number of the second user's data-transceiving equipment, time during the videophone mode, and image recording time can be stored.

The above information is often recorded in the data-transceiving equipment. As a result, the control unit 41 may allow the storing unit 45 to automatically store the display image-related information without waiting for instructions from the user.

With regard to information that is not recorded in the data-transceiving equipment, the user can enter texts using the input unit 1 into the storing unit 45. Consequently, the storing unit 45 is free to store such information.

As described above, when the storing unit 45 stores the display image (blended image) as well as the display image (blended image)-related information, then it makes it feasible to aid the user in searching the stored display image (blended image) for reuse thereof. This feature provides improved user-friendliness.

The compression-expansion system employed by both of the decoding unit 46 and the encoding unit 44 is not limited to MPEG-4 as discussed above. The present embodiment may employ another compression-expansion system that copes with encoding and decoding for each object.

According to the present embodiment, the encoding unit 44 multiplexes several pieces of encoded image data (bit streams) with each other. Alternatively, the control unit 41 may multiplexes the encoded image data (bit streams) in a similar manner. In this way, different styles of multiplexing are available.

According to the present embodiment, the decoding unit 46 separates several pieces of encoded image data (bit streams) from each other. Alternatively, the control unit 41 may separates the encoded image data (bit streams) in a similar manner. In this way, different styles of separation are available.

Second Embodiment

Figure 2:
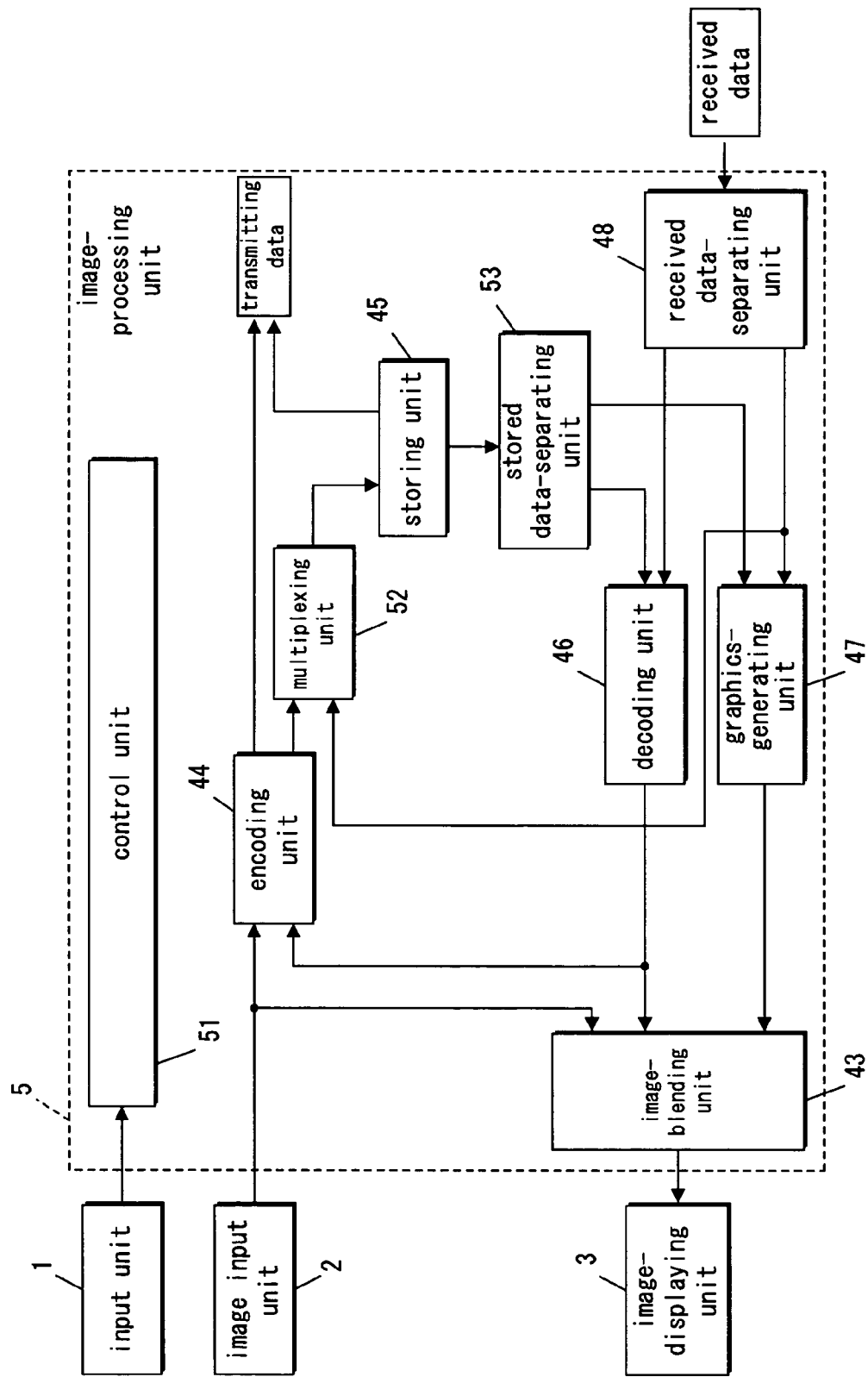
FIG. 2 is a block diagram illustrating data-transceiving equipment according to a second embodiment.

FIG. 2 is a block diagram illustrating data-transceiving equipment according to a second embodiment. In FIG. 2, the same components as those of FIG. 1 are identified by the same reference numerals; therefore, descriptions related thereto are omitted.

As illustrated in FIG. 2, the data-transceiving equipment includes an input unit 1, an image input unit 2, an image-displaying unit 3, and an image-processing unit 5.

The image-processing unit 5 includes an image-blending unit 43, an encoding unit 44, a multiplexing unit 52, a storing unit 45, a stored data-separating unit 53, a decoding unit 46, a graphics-generating unit 47, a control unit 51, and a received data-separating unit 48.

The input unit 1 enters instructions from a user as an electrical signal into the control unit 51.

The image input unit 2 generates digital image data. The image input unit 2 feeds the generated digital image data as input image data into both of the encoding unit 44 and the image-blending unit 43.

The encoding unit 44 individually encodes respective pieces of image data of images from the decoding unit 46 and the image input unit 2.

The encoding unit 44 transmits the encoded image data to the outside of the data-transceiving equipment.

Alternatively, the encoding unit 44 transmits the encoded image data to the multiplexing unit 52.

The storing unit 45 stores multiplexed data in response to instructions from the control unit 51 to record a display image. The multiplexed data issues from the multiplexing unit 52. As described later, the multiplexed data includes the encoded image data from the encoding unit 44, and graphics data from the received data-separating unit 48. The multiplexing unit 52 multiplexes the encoded image data and the graphics data with one another.

When receiving the multiplexed data as received data from the outside of the data-transceiving equipment, then the received data-separating unit 48 separates the multiplexed data into two different pieces of the encoded image data and the graphics data.

The received data-separating unit 48 feeds the separated encoded image data and the separated graphics data into the decoding unit 46 and the multiplexing unit 52, respectively.

When receiving non-multiplexed data as received data from the outside of the data-transceiving equipment, then the received data-separating unit 48 feeds the received data or rather the encoded image data into the decoding unit 46.

The decoding unit 46 decodes the encoded image data from the received data-separating unit 48 as well as encoded image data from the stored data-separating unit 53. As described later, the encoded image data from the stored data-separating unit 53 is generated by the encoding unit 44 and separated from the multiplexed data that is produced by the multiplexing unit 52.

The graphics-generating unit 47 generates graphics image data based on entering graphics data.

There are two different pieces of graphics data. One of them is generated in the transceiving unit, and is then fed into the graphics-generating unit 47 through the control unit 51. The other is received from the outside of the transceiving unit, and is then fed into the graphics-generating unit 47 through the received data-separating unit 48.

The image-blending unit 43 blends respective pieces of entering image data with each other from the decoding unit 46, the graphics-generating unit 47, and the image input unit 2, thereby producing display image data (blended image data). The display image data (blended image data) is sent to the image-displaying unit 3.

More specifically, the image-blending unit 43 enlarges, downsizes, and filters the respective pieces of entering image data in accordance with display image combination instruction data from the control unit 51, thereby blending images with each other in accordance with a display position and overlaying sequence of each designated one of the images. As a result, the display image data (blended image data) is generated.

The display image combination instruction data includes information to show the way of blending several images with each other.

The image-displaying unit 3 displays an image thereon based on the display image data (blended image data) from the image-blending unit 43.

The multiplexing unit 52 multiplexes the graphics data with bit streams of the encoded image data from the encoding unit 44.

The graphics data as given above is either one from the received data-separating unit or another from the control unit 51.

The multiplexing unit 52 also multiplexes the encoded image data with the display image combination instruction data that has entered the image-blending unit 43.

The multiplexing unit 52 feeds the resulting multiplexed data into the storing unit 45 to record and retain the multiplexed data.

When receiving instructions from the control unit 51 to read the data from the storing unit 45, the stored data-separating unit 53 separates the multiplexed data from the storing unit 45 into three different pieces of the encoded image data, the graphics data, and the display image combination instruction data.

The stored data-separating unit 53 feeds the encoded image data, the graphics data, and the display image combination instruction data into the decoding unit 46, the graphics-generating unit 47, and the control unit 51, respectively.

The control unit 51 controls each component in the image-processing unit 5.

The following discusses in detail details-behaviors during a videophone mode, an image-recording step, a replaying step, and an editing-processing step.

The behaviors during the videophone mode according to the present embodiment are similar to those according to the previous embodiment, and descriptions related thereto are omitted. The control unit 51 practices behaviors of the control unit 41 according to the previous embodiment.

The image-recording step is now described.

When a user enters instructions into the control unit 51 using the input unit 1 during the videophone mode to record a display image displayed on the image-displaying unit 3, then the control unit 51 generates a control signal to record the display image.

When the control signal from the control unit 51 enters the encoding unit 44, then the encoding unit 44 encodes the display image, in addition to encoding of an input image from the image input unit 2 to feed the encoded input image as transmitting data to the outside of the data-transceiving equipment.

In the encoding of the display image, the encoding unit 44 individually encodes display image-forming image elements that come from both of the image input unit 2 and the decoding unit 46. The encoding unit 44 multiplexes the individually encoded image elements with each other. As a result, a piece of encoded image data is provided.

In such a multiplexing step, header information as well as display image combination instruction data on object images to be multiplexed is added to the encoded image data. As a result, respective pieces of encoded data of the object images are multiplexed with each other.

The header information as discussed above includes a list of the object images to be multiplexed (a multiplexed image list), and information on a synchronizing signal indicative of timing to replay the object images. The display image combination instruction data on object images to be multiplexed enters the image-blending unit 43 from the control unit 51.

The multiplexing step taken by the encoding unit 44 according to the present embodiment differs from that according to the previous embodiment in that the graphics image data from the graphics-generating unit 47 are non-multiplexed.

The multiplexing unit 52 further multiplexes the multiplexed data (multiplexed, encoded image data) from the encoding unit 44 with graphics data required to create a graphics image that forms part of the display image.

In the multiplexing step as given above, the multiplexed data from the encoding unit 44 is multiplexed with the graphics data including header information and graphics image-related, display image combination instruction data.

The storing unit 45 stores the multiplexed data from the multiplexing unit 52.

The header information includes a piece of information showing that graphics images to be multiplexed has been added to the multiplexed image list, and a piece of information on a synchronizing signal indicative, of timing to replay the graphics images. The graphics image-related, display image combination instruction data enters the image-blending unit 43 from the control unit 51.

A step of replaying the stored display image in the storing unit 45 is now described.

To replay the recorded display image in the storing unit 45, the stored data-separating unit 53 reads relevant multiplexed data (created by the multiplexing unit 52) from the storing unit 45 in response to instructions from the control unit 51 to replay the display image.

The stored data-separating unit 53 separates the read multiplexed data (created by the multiplexing unit 52) into four different pieces of data that follow: the multiplexed data from the encoding unit 44 (i.e., the multiplexed, encoded image data created by the encoding unit 44); the graphics data; the header information; and the graphics image-related, display image combination instruction data.

The stored data-separating unit 53 feeds the multiplexed, encoded image data and the graphics data into the decoding unit 46 and the graphics-generating unit 47, respectively. The stored data-separating unit 53 feeds both of the header information and the graphics image-related, display image combination instruction data into the control unit 51.

The decoding unit 46 separates the object image-related, display image combination instruction data from the multiplexed, encoded image data because the object image-related, display image combination instruction data is multiplexed with the multiplexed, encoded image data. The decoding unit 46 feeds the separated display image combination instruction data into the control unit 51.

The control unit 51 analyzes the header information on both of the encoded image data and the graphics data. The control unit 51 feeds, into the image-blending unit 43, results from the analysis of the multiplexed image list as well as the analysis of the information on the synchronizing signal indicative of timing to replay object images and graphics images.

The control unit 51 fees the display image combination instruction data into the image-blending unit 43.

The image-blending unit 43 detects display image-forming images in accordance with the multiplexed image list. The image-blending unit 43 allows a list of the detected display image-forming images to be displayed on the image-displaying unit 3.

As a result, the user recognizes images that form the display image.

Assume that the user selects, from the list displayed on the image-displaying unit 3, an image to be displayed at this time. When the user enters such selected information into the control unit 51 using the input unit 1, then the control unit 51 feeds a control signal into both of the decoding unit 46 and the graphics-generating unit 47. The control signal shows an image to be decoded or generated (i.e., an image specified by the selected information).

The decoding unit 46 decodes only an object image specified by the control signal, thereby feeding the decoded object image into the image-blending unit 43.

The graphics-generating unit 47 generates only a graphics image specified by the control signal, thereby feeding the generated graphics image into the image-blending unit 43.

The image-blending unit 43 processes the images from both of the decoding unit 46 and the graphics-generating unit 47 in accordance with the entered display image combination instruction data. As a result, a new display image is provided.

The image-displaying unit 3 displays the new display image thereon.

A step of editing or processing the stored display image in the storing unit 45 is similar to that according to the previous embodiment, and descriptions related thereto are omitted.

The control unit 51 provides behaviors of the control unit 41 according to the previous embodiment.

As described above, according to the present embodiment, the image data from the image input unit 2 and the decoded data from the decoding unit 46 are stored and encoded individually, while, as to a graphics image that form part of a display image (blended image), graphics data required to generate the graphics image is stored.

When the user wants to reuse, more specifically, replay, edit, or transmit the stored display image (blended image) in the storing unit 45, the user can select required image elements to decode the stored display image (blended image) or to generate the graphics image, thereby reusing the stored display image (blended image) and the graphics image.

This feature provided improved user-friendliness.

According to the present embodiment, the graphics data, not graphics image data that is based on the graphics data, is stored. This feature requires a smaller amount of storage capacity, and records long video. In this way, the storing unit 45 is usable in a highly efficient manner.

According to the present embodiment, when the display image is stored in the storing unit 45 during the videophone mode, information on the display image to be stored can be stored as well. This feature is similar to that according to the previous embodiment.

According to the present embodiment, the multiplexing unit 52 multiplexes the following with each other: the multiplexed bit streams having several pieces of encoded image data (bit streams) multiplexed with each other; the graphics data; and, the display image combination instruction data.

Alternatively, the encoding unit 44 may only encode each piece of image data, while the multiplexing unit 52 may multiplex the several pieces of encoded image data, the graphics data, and the display image combination instruction data with each other.

As a further alternative, the control unit 51 may practice the multiplexing.

Thus, the present embodiment does not limit the way of multiplexing several different pieces of data with each other.

According to the present embodiment, the stored data-separating unit 53 separates the following from each other: multiplexed bit streams having several pieces of encoded image data (bit streams) multiplexed with each other; the graphics data; and the display image combination instruction data. The decoding unit 46 further separates the multiplexed bit streams into several different pieces of encoded image data.

Alternatively, the stored data-separating unit 53 may separate the multiplexed bit streams into several different pieces of encoded image data, while the decoding unit 46 may decode only these different pieces of encoded image data.

As a further alternative, the control unit 51 may practice the above separation.

Thus, the present embodiment does not limit the way of separating several different pieces of data from each other.

The following discusses a variant of the present embodiment. Pursuant to the present variant, the control unit 51 practices a switchover between first and second modes.

In the first mode, as to a graphics image, graphics data that underlies the graphics image is stored in the storing unit 45. This means that the first mode practices the processing according to the second embodiment.

In the second mode, as to the graphics image, graphics image data encoded by the encoding unit 44 is stored in the storing unit 45. This means that the second mode practices the processing according to the first embodiment.

The switchover between the first and second modes is realized in accordance with instructions from the control unit 51.

With regard to the graphics image that forms part of a display image (blended image), the present variant can select either the encoding and storage of the graphics image data or the storage of the graphics data required to produce the graphics image.

As a result, a pattern of graphics image-related storage is selectable, depending upon situations, and improved user-friendliness is achievable.

For example, when the display image including the graphics image is transmitted to a receiving terminal without the graphics-generating unit, the graphics image data from the graphics-generating unit 47 are encoded by the encoding unit 44 before being transmitted to the receiving terminal, so that the receiving terminal can replay the transmitted display image. In this way, a pattern of graphics image-related storage is selectable in dependence upon situations.

Third Embodiment

Figure 3:
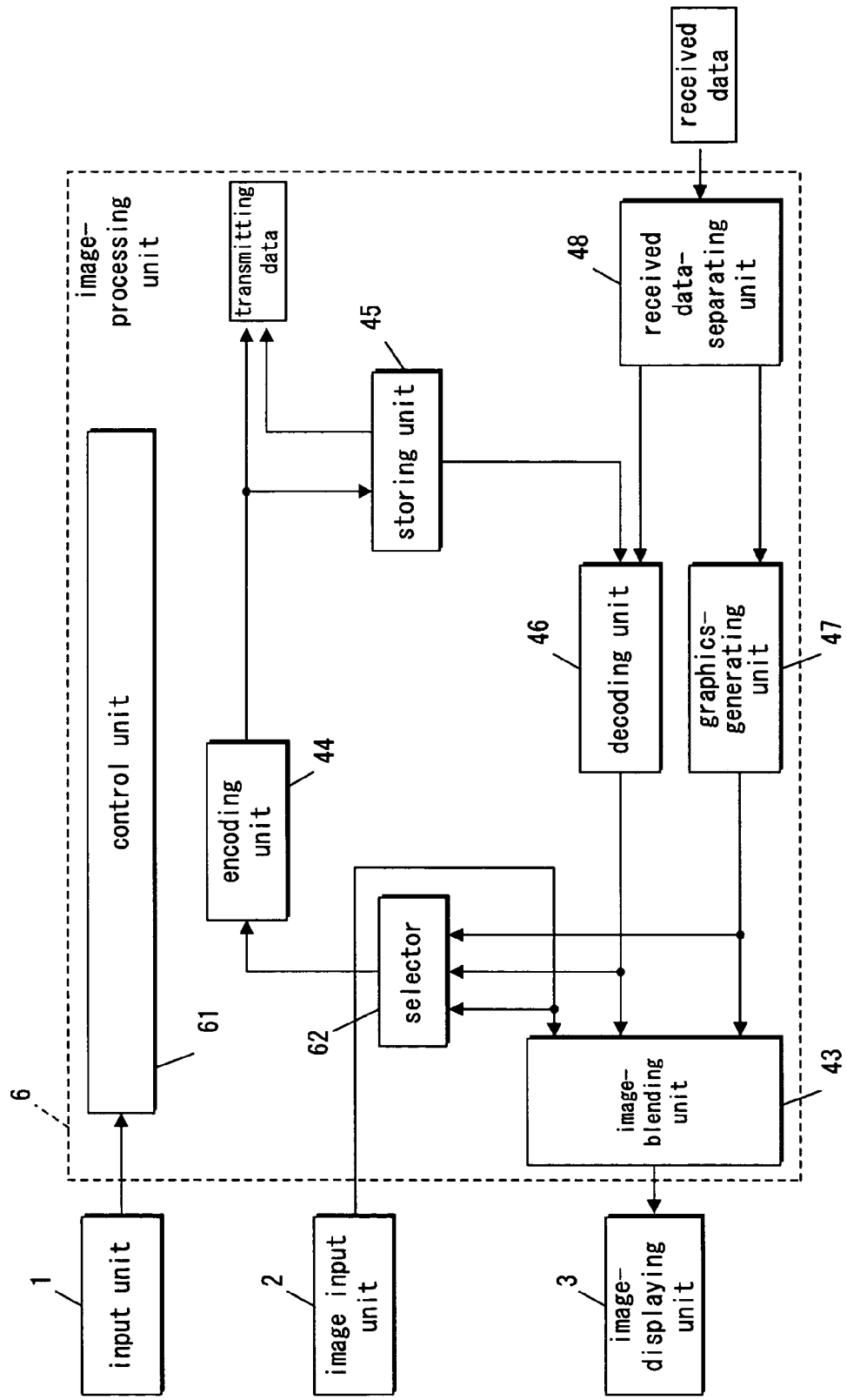
FIG. 3 is a block diagram illustrating data-transceiving equipment according to a third embodiment.

FIG. 3 is a block diagram illustrating data-transceiving equipment according to a third embodiment. In FIG. 3, the same components as those of FIG. 1 are identified by the same reference numerals, and descriptions related thereto are omitted.

As illustrated in FIG. 3, the data-transceiving equipment, includes an input unit 1, an image input unit 2, an image-displaying unit 3, and an image-processing unit 6.

The image-processing unit 6 includes an encoding unit 44, a storing unit 45, a decoding unit 46, a graphics-generating unit 47, a received data-separating unit 48, an image-blending unit 43, a selector 62, and a control unit 61.

The input unit 1, the image input unit 2, the decoding unit 46, the graphics-generating unit 47, the image-blending unit 43, the image-displaying unit 3, the encoding unit 44, the storing unit 45, and the received data-separating unit 48 are, similar to those in data-transceiving equipment according to the first embodiment. The control unit 61 practices behaviors of the control unit 41 according to the first embodiment.

The selector 62 selects at least one of respective pieces of image data from the image input unit 2, the decoding unit 46, and the graphics-generating unit 47 in response to instructions from the control unit 61. The selector 62 feeds the selected piece of image data into the encoding unit 44.

The control unit 61 controls each component in the image-processing unit 6.

The following discusses behaviors during a videophone mode.

A transmitting step is now described.

The image input unit 2 photographs a photographic subject, thereby entering a first user's image (primarily a first user's self portrait) into the image-processing unit 6.

The selector 62 selects the entered image from the image input unit 2, thereby feeding the selected image into the encoding unit 44.

The encoding unit 44 encodes the image from the selector 62, thereby transmitting the encoded image data to second user's data-transceiving equipment.

A receiving step is similar to that according to the first embodiment, and descriptions related thereto are omitted. The control unit 61 executes behaviors of the control unit 41 according to the first embodiment.

The above discusses the behaviors during the videophone mode.

An image-recording step is now described.

When a user enters instructions into the control unit 61 using the input unit 1 during the videophone mode to record a display image displayed on the image-displaying unit 3, then the control unit 61 generates a control signal to record the display image.

At the same time, the control unit 61 produces another control signal in response to the instructions from, the user through the input unit 1. This control signal specifies image data to be recorded in the storing unit 45. The specified image data is selected from among respective pieces of image data from the image input unit 2, the decoding unit 46, and the graphics-generating unit 47.

The selector 62 feeds the specified image data into the encoding unit 44 in response to the control signal.

When the user does not specify any image data to be recorded, then the selector 62 feeds all of the three different pieces of image data as discussed above into the encoding unit 44.

When the storing unit 45 is insufficient in capacity to record the image data, then the selector 62 is prevented from feeding all of the three different pieces of image data into the encoding unit 44. Instead, the selector 62 under the control of the control unit 61 selects image data to be encoded, in accordance with the available capacity of the storing unit 45. The selector 62 feeds the selected image data into the encoding unit 44.

Upon receipt of the control signal from the control unit 41 to record the image data, the encoding unit 44 encodes the display image as well as an input image from the image input unit 2 to transmit the encoded image as transmitting data to the outside of the data-transceiving equipment.

In the encoding of the display image, the encoding unit 44 encodes an image selected by the selector 62 from among the first user's image from the image input unit 2, a second user's image from the decoding unit 46, and a graphics image from the graphics-generating unit 47.

At this time, the encoding unit 44 individually encodes display image-forming image elements selected by the selector 62. The encoding unit 44 multiplexes the individually encoded image elements with each other, thereby providing a piece of encoded image data.

In the multiplexing step as, discussed above, header information as well as display image combination instruction data that enters the image-blending unit 43 from the control unit 61 is added to the encoded image data. As a result, encoded data of object images are multiplexed with encoded data of graphics images.

The storing unit 45 stores such multiplexed data (i.e., the encoded image data of the display image).

The header information includes a list of object images and graphics images to be multiplexed (a multiplexed image list), and information on a synchronizing signal indicative of timing to replay the object images and graphics images.

The display image recorded in the storing unit 45 is replayed, edited, and processed in a manner similar to that of the first embodiment. The control unit 61 executes behaviors of the control unit 41 according to the first embodiment.

As described above, pursuant to the present embodiment, the selector 62 selects image data from among display image (blended image)-forming image data, with the result that the selected image data is stored and encoded. The display image (blended image)-forming image data includes the image data from the image input unit 1, the decoded data from the decoding unit 46, and the graphics image data from the graphics-generating unit 47.

This system allows a user to selectively decode required image elements for reuse thereof when the user intends to reuse, more specifically, replay, edit, or transmit the stored display image (blended image) in the storing unit 45.

This feature provides improved user-friendliness.

Pursuant to the present embodiment, the use of the selector 62 establishes a pattern of storing the display image (blended image) in accordance with user's preference as well as the available capacity of the storing unit 45.

The use of the selector 62 according to the present embodiment makes it feasible to store only required image data. As a result, storing unit 45 is usable in a highly efficient manner. For example; long recording is realized.

Pursuant to the present embodiment, when storing the display image during the videophone mode, the storing unit 45 can store information on the display image to be stored. This feature is similar to that according to the first embodiment.

Fourth Embodiment

Figure 4:
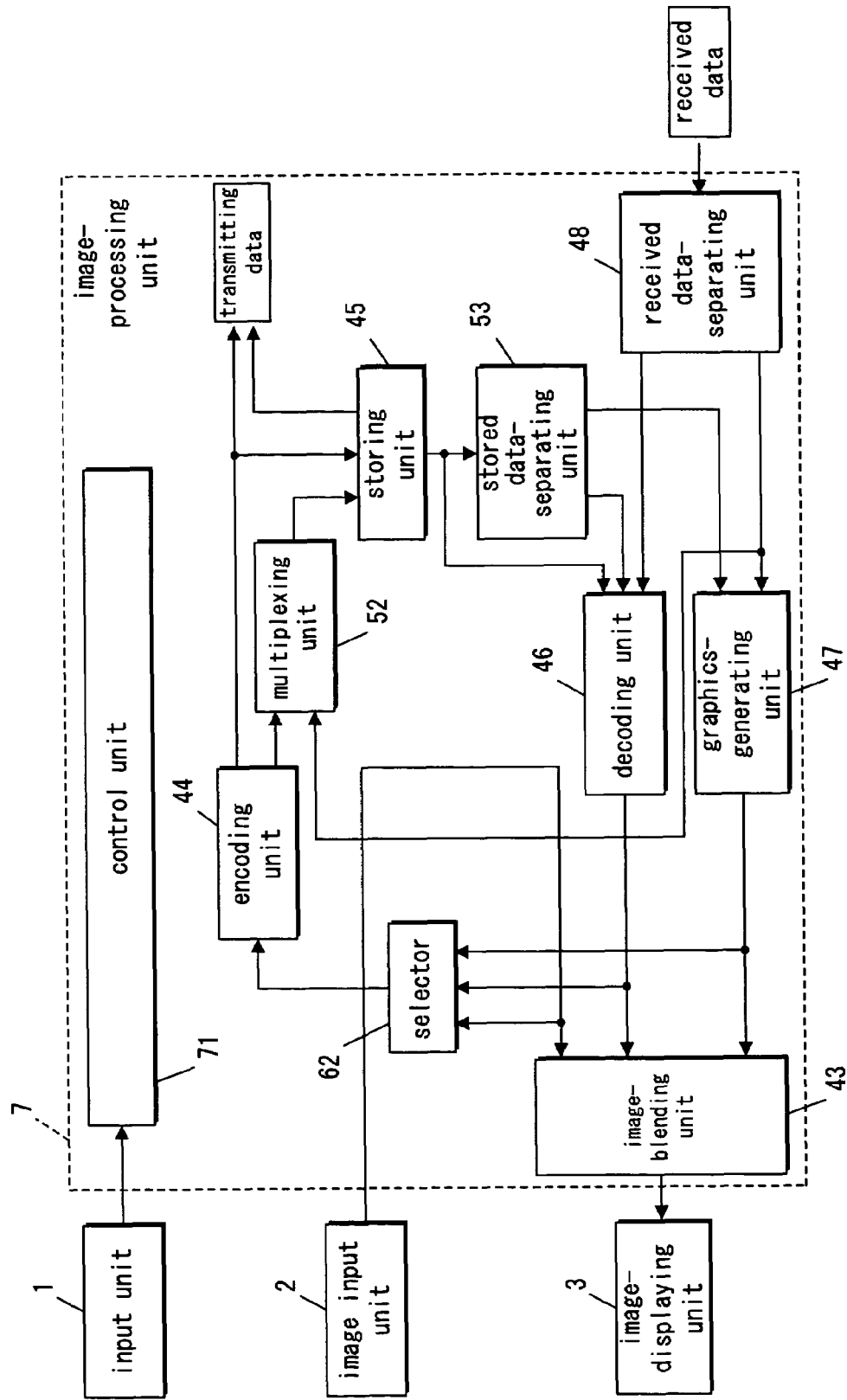
FIG. 4 is a block diagram illustrating data-transceiving equipment according to a fourth embodiment.
Figure 5:
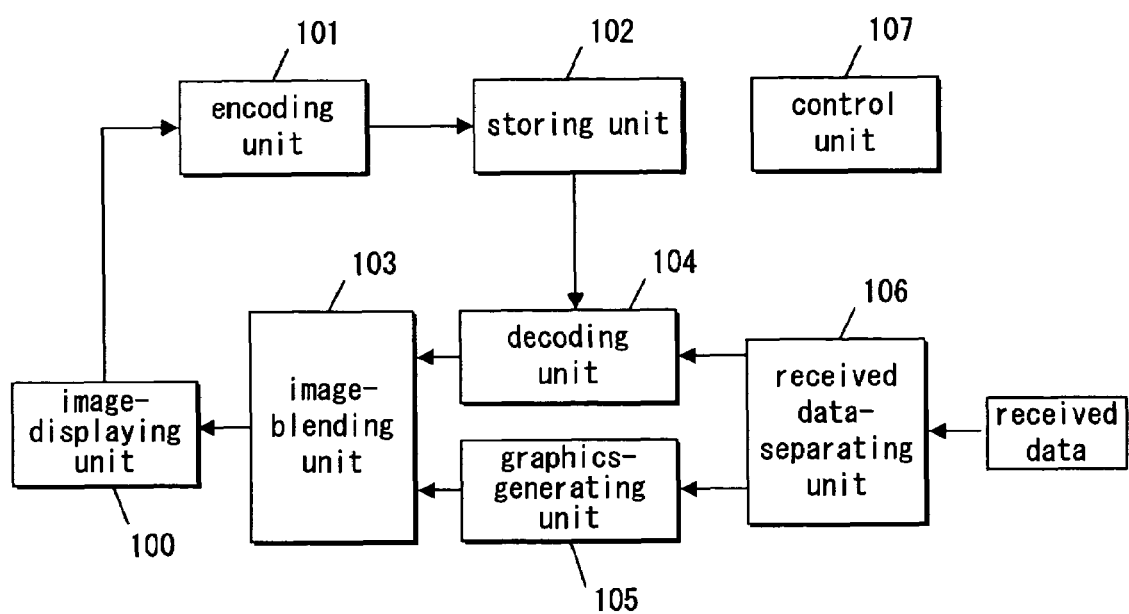
FIG. 5 is a block diagram illustrating prior art data-transceiving equipment.

FIG. 4 is a block diagram illustrating data-transceiving equipment according to a fourth embodiment. In FIG. 4, the same components as those of FIGS. 1, 2, and 3 are identified by the same reference numerals, and descriptions related thereto are omitted.

As illustrated in FIG. 4, the data-transceiving equipment includes an input unit 1, an image input unit 2, an image-displaying unit 3, and an image-processing unit 7.

The image-processing unit 7 includes an encoding unit 44, a multiplexing unit 52, a storing unit 45, a stored data-separating unit 53, a received data-separating unit 48, a decoding unit 46, a graphics-generating unit 47, an image-blending unit 43, a selector 62, and a control unit 71.

The input unit 1, the decoding unit 46, the graphics-generating unit 47, the image-blending unit 43, the image-displaying unit 3, the image input unit 2, the encoding unit 44, the received data-separating unit 48, and the storing unit 45 are similar to those of data-transceiving equipment according to the first embodiment. The control unit 71 practices behaviors of the control unit 41 according to the first embodiment.

The multiplexing unit 52 and the stored data-separating unit 53 are similar to those of data-transceiving equipment according to the second embodiment. The control unit 71 practices behaviors of the control unit 51 according to the second embodiment.

The selector 62 is similar to that of data-transceiving equipment according to the third embodiment. The control unit 71 practices behaviors of the control unit 61 according to the third embodiment.

The control unit 71 controls each component in the image-processing unit 7.

Behaviors during a videophone mode according to the present embodiment are similar to those according to the third embodiment, and descriptions related thereto are omitted. The control unit 71 practices behaviors of the control unit 61 according to the third embodiment.

An image-recording step is now described. The image-recoding step includes first and second modes.

The first mode allows the selector 62 to select graphics image data produced by the graphics-generating unit 47.

In the first mode, the encoding unit 44 encodes the selected graphics image data from the selector 62. The encoded graphics image data is multiplexed with other encoded image data.

The second mode precludes the selector 62 from selecting the graphics image data from the graphics-generating unit 47.

In the second mode, the received data-separating unit 48 feeds graphics data into the multiplexing unit 52 in response to instructions from the control unit 71 to store the graphics data. The graphics data underlies the graphics image data.

The multiplexing 52 multiplexes the graphics data with encoded image data from the encoding unit 44.

As a result, a switchover between the first and second modes provides a selection between the storage and multiplexing, of the graphics image data and those of the graphics data that underlies the graphics image data.

The control unit 71 instructs the switchover between the first and second modes. For example, the control unit 71 may switch the modes in response to instructions from a user through the input unit 1. Alternatively, the control unit 71 may do the same, e.g., in dependant upon varying circumstances.

The mode switchover provides a selection as given below. That is, as to a graphics image, the graphics data are stored as in the second mode when an image recorded in a first user's terminal is reused, i.e., when the recorded image is replayed, edited, or processed. As to the graphics image, the encoded image data obtained by encoding the graphics image data from the graphics-generating unit 47 are stored as in the first mode when a display image including the graphics image is sent to a second user's terminal without the graphics-generating unit.

Alternatively, either the first mode or the second mode may be fixed.

The image-recoding step during the first mode is similar to that according to the third embodiment, and descriptions related thereto are omitted. The control unit 71 provides behaviors of the control unit 61 according to the third embodiment.

Different from the third embodiment, when the control unit 71 does not specify image data to be recorded, and when the storing unit 45 is insufficient in vacant capacity to record the image data, then the selector 62 does not select the graphics image data, but the storing unit 45 may store graphics data that underlies the non-selected graphics image data.

An image-recording step during the second mode is now described.

When a user enters instructions into the control unit 71 using the input unit 1 to record a display image displayed on the image-displaying unit 3, then the control unit 71 generates a control signal to record the display image.

At the same time, the control unit 71 generates another control signal in response to the instructions from the user. This control signal specifies image data to be recorded in the storing unit 45. The specified image data is selected from among image data from the image input unit 2, image data from the decoding unit 46, and the graphics data from the received data-separating unit 48.

The selector 62 feeds the specified image data into the encoding unit 44 in response to the control signal.

When the control signal instructs the received data-separating unit 48 to store the graphics data, then the received data-separating unit 48 feeds the graphics data into the multiplexing unit 52.

When the user specifies no image data to be recorded, then all images that form the display image are recorded.

In this instance, the selector 62 feeds both of the image data from the image input unit 2 and that from the decoding unit 46 into the encoding unit 44.

At the same time, the received data-separating unit 48 feeds the graphics data into the multiplexing unit 52.

When the storing unit 45 is insufficient in recording capacity, then not all images that form the display image are recorded. Instead, the selector 62 under the control of the control unit 71 can select image data to be encoded, in accordance with the vacant capacity of the storing unit 45. The selected image data to be encoded is fed into the encoding unit 44.

In this instance, the received data-separating unit 48 under the control of the control unit 71 may be prevented from feeding the graphics data into the multiplexing unit 52.

Upon receipt of the control signal from the control unit 71 to record the display image, the encoding unit 44 encodes the display image as well as an input image from the image input unit 2 to feed the encoded input image as transmitting data into the outside of the data-transceiving equipment.

In the encoding of the display image, the encoding unit 44 encodes an image selected by the selector 62 from between a first user's image from the image input unit 2 and a second user's image from the decoding unit 46.

At this step, the encoding unit 44 individually encodes display image-forming image elements selected by the selector 62. The encoding unit 44 multiplexes the individually encoded image elements with each other, thereby providing a piece of encoded image data.

In this multiplexing step, header information as well as display image combination instruction data on object images to be multiplexed is added to the encoded image data. As a result, respective pieces of encoded data of the object images are multiplexed with each other.

The header information includes a list of the object images to be multiplexed (a multiplexed image list), and information on a synchronizing signal showing timing to replay the object images. The display image combination instruction data on object images to be multiplexed enters the image-blending unit 43 from the control unit 71.

Upon receipt of the graphics data from the received data-separating unit 48 (the received graphics data is required to generate a graphics image that forms part of the display image), the multiplexing unit 52 further multiplexes the received graphics data with the multiplexed data (multiplexed, encoded image data) from the encoded unit 44.

In this multiplexing step, the graphics data including header information and graphics image-related, display image combination instruction data is multiplexed with the multiplexed data from the encoding unit 44.

The storing unit 45 stores the multiplexed data from the multiplexing unit 52.

The header information includes a piece of information showing that the graphics image to be multiplexed has been added to the multiplexed image list, and a piece of information on a synchronizing signal representative of timing to replay the graphics images. The graphics image-related, display image combination instruction data enters the image-blending unit 43 from the control unit 71.

When receiving no graphics data from the received data-separating unit 48, then the multiplexing unit 52 feeds the multiplexed data (multiplexed, encoded image data) from the encoding unit 44 as such into the storing unit 45.

The storing unit 45 stores the multiplexed data from the encoding unit 44.

The display image recorded in the storing unit 45 during the first mode is replayed, edited, and processed in a manner similar to that of the first embodiment. The control unit 71 executes behaviors of the control unit 41 according to the first embodiment.

The display image recorded in the storing unit 45 during the second mode is replayed, edited, and processed in a manner similar to that of the second embodiment. The control unit 71 executes behaviors of the control unit 51 according to the second embodiment.

As described above, in the first mode, the image data selected by the selector 62 from the display image (blended image)-formed data, i.e., the image data from the image input unit 1, the decoded data from the decoding unit 46, and the graphics image data from the graphics-generating unit 47, is stored and individually encoded.

Alternatively, in the second mode, the image data selected by the selector 62 from the display image (blended image)-formed data, i.e., the image data from the image input unit 1 and the decoded data from the decoding unit 46, is stored and individually encoded. As to the graphics image that forms part of a display image (blended image), the graphics data required to generate the graphics image is stored in the second mode in response to instructions from the control unit 71.

When a user want to reuse, more specifically, replay, edit, or transmit the display image (blended image) stored in the storing unit 45, the user may select required image elements to decode the stored display image (blended image) or to generate the graphics image. As a result, the display image (blended image) and the graphics image are reusable.

This feature provides improved user-friendliness.

Pursuant to the present embodiment, the use of the selector 62 can establish a pattern of storing the display image (blended image) in accordance with user's preference and the vacant capacity of the storing unit 45.

Pursuant to the present embodiment, the use of the selector 62 makes it feasible to store only required image data. As a result, the storing unit 45 is usable in a highly efficient manner. For example, long recording is achievable.

According to the present embodiment, as to the graphics image that forms part of the display image (blended image), either the first mode in which the graphics image data is stored and encoded, or the second mode in which the graphics data required to produce the graphics image is stored is selectable.

This feature selects a pattern of graphics image-related storage in dependence upon situations, and provides improved user-friendliness.

For example, when the display image including the graphics image is transmitted to a receiving terminal without the graphics-generating unit, the graphics image data from the graphics-generating unit 47 is encoded by the encoding unit 44 before being transmitted to the receiving terminal, in order to allow the receiving terminal to replay the transmitted display image. In this way, a pattern of graphics image-related storage is selectable, depending upon situations.

In the second mode according to the present embodiment, not the graphics image data, but the graphics data that underlies the graphics image data is stored. This feature requires a smaller amount of storage capacity, and records long video. As a result, the storing unit 45 is usable in a highly efficient manner.

According to the present embodiment, when the storing unit 45 stores the display image during the videophone mode, information on the display image to be stored can also be stored. This feature is similar to that according to the first embodiment.

The following discusses a variant of the present embodiment. The present variant is possible to selectively determine whether graphics-related data (graphics image data and graphics data) is stored in the storing unit 45.

Furthermore, when it is selectively determined that the graphics-related data is stored in the storing unit 45, then the present variant is possible to select either the graphics image data or the graphics data in order to store the selected data.

The present variant is more specifically described as given below.

The control unit 71 produces a control signal to specify image data to be recorded in the storing unit 45. The specified image data is selected from among the image data from the image input unit 2, the image data from the decoding unit 46, and the graphics-related data (graphics image data and graphics data).

To force the graphics-related data into storage, the control unit 71 provides a further control signal including information that specifies which data is stored between the graphics image data and the graphics data.

The selector 62 selects the image data specified by the control signal from the control unit 71. The selector 62 feeds the selected image data into the encoding unit 44.

At this time, the selector 62 feeds the graphics image data into the encoding unit 44 when the control signal instructing the storage of the graphics-related data includes information that instructs the storage of the graphics image data. The subsequent steps are similar to those according to the fourth embodiment.

The selector 62 does not feed the graphics image data into the encoding unit 44 when the control signal instructing the storage of the graphics-related data includes information that instructs the storage of the graphics data.

The received data-separating unit 48 feeds the graphics data into the multiplexing unit 52 when the control signal instructing the storage of the graphics-related data includes the information that instructs the storage of the graphics data. The subsequent steps are similar to those according to the fourth embodiment.

The received data-separating unit 48 does not feed the graphics data into the multiplexing unit 52 when the control signal instructing the storage of the graphics-related data includes the information that instructs the storage of the graphics image data.

The control unit 71 may generate the control signal having the content defined for each case. Alternatively, the control unit 71 may generate the control signal in response to information from the input unit 1.

The present variant is characterized in, that a selection can be made as to whether the graphics-related data (the graphics image data and the graphics data) are stored, and further that a selection can be made between the graphics image data and the graphics data to store the selected data.

As a result, the present variant provides improved user-friendliness, and highly efficient use of the storing unit 45.

Pursuant to the present invention, display image (blended image)-formed data as given below are stored and individually encoded. The display image (blended image)-formed data includes the image data from the image input unit, the encoded data from the encoding unit, and the graphics image data from the graphics-generating unit.

Pursuant to the present invention, the display image (blended image)-formed data or rather the image data from the image input unit and the decoded data from the decoding unit are stored and individually encoded, while, as to the graphics image that form part of the display image (blended image), the graphics data required to generate the graphics image are stored.

When the user needs to reuse, more specifically, replay, edit, or transmit the stored display image (blended image), the user may select required image elements to decode stored the display image (blended image) or to generate the graphics image. As a result, the display image (blended image) and the graphics image are reusable.

This feature provides improved user-friendliness.

INDUSTRIAL APPLICABILITY

The data-transceiving equipment according to the present invention is preferably applicable in the field of, e.g., a videophone-equipped handset.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

The invention claimed is:

1. Data-transceiving equipment comprising:
a received data-separating unit operable to separate received data into two different pieces of encoded data and graphics data, thereby providing the encoded data and the graphics data, when the received data includes the encoded data and the graphics data, said received data-separating unit being operable to provide the encoded data when the received data includes the encoded data, but not the graphics data;
a decoding unit operable to decode the encoded data from said received data-separating unit, thereby providing decoded data;
a graphics-generating unit operable to generate graphics image data based on the graphics data from said received data-separating unit, thereby providing the graphics image data;
an image input unit operable to enter image data;
an image-blending unit operable to blend a plurality of images with one another to provide blended image data, the plurality of images being represented by at least two pieces of data selected from among the decoded data from said decoding unit, the graphics image data from said graphics-generating unit, and the image data from said image input unit;
an image-displaying unit operable to display a blended image based on the blended image data from said image-blending unit;
an encoding unit operable to individually encode each of the image data from said image input unit, the decoded data from said decoding unit, and the graphics image data from said graphics-generating unit; and
a storing unit operable to store the encoded image data, the encoded decoded data, and the encoded graphics image data.

2. Data-transceiving equipment comprising:
a received data-separating unit operable to separate received data into two different pieces of encoded data and graphics data, thereby providing the encoded data and the graphics data, when the received data includes the encoded data and the graphics data, said received data-separating unit being operable to provide the encoded data when the received data includes the encoded data, but not the graphics data;

a decoding unit operable to decode the encoded data from said received data-separating unit, thereby providing decoded data;

a graphics-generating unit operable to generate graphics image data based on the graphics data from said received data-separating unit, thereby providing the graphics image data;

an image input unit operable to enter image data;

an image-blending unit operable to blend a plurality of images with one another to provide blended image data, the plurality of images being represented by at least two pieces of data selected from among the decoded data from said decoding unit, the graphics image data from said graphics-generating unit, and the image data from said image input unit;

an image-displaying unit operable to display a blended image based on the blended image data from said image-blending unit;

an encoding unit operable to individually encode each of the image data from said image input unit and the decoded data from said decoding unit, thereby providing encoded data;

a multiplexing unit operable to multiplex the encoded data from said encoding unit with the graphics data from said received data-separating unit, thereby providing multiplexed data;

a storing unit operable to store the multiplexed data from said multiplexing unit; and a stored data-separating unit operable to separate the multiplexed data from said storing unit into two different pieces of the encoded data and the graphics data, thereby providing the encoded data and the graphics data separately.

3. Data-transceiving equipment as defined in claim 2, further comprising:

a control unit, wherein, as to a graphics image, a first mode allows said storing unit to store the graphics data that underlies the graphics image, wherein, as to the graphics image, a second mode allows said storing unit to store the encoded graphics image data from said encoding unit, and wherein a switchover between the first and second modes is realized in accordance with instructions from said control unit.

4. Data-transceiving equipment comprising:

a received data-separating unit operable to separate received data into two different pieces of encoded data and graphics data, thereby providing the encoded data and the graphics data, when the received data includes the encoded data and the graphics data, said received data-separating unit being operable to provide the encoded data when the received data includes the encoded data, but not the graphics data;

a decoding unit operable to decode the encoded data from said received data-separating unit, thereby providing decoded data;

a graphics-generating unit operable to generate graphics image data based on the graphics data from said received data-separating unit, thereby providing the graphics image data;

an image input unit operable to enter image data;

an image-blending unit operable to blend a plurality of images with one another to provide blended image data, the plurality of images being represented by at least two pieces of data selected from among the decoded data from said decoding unit, the graphics image data from said graphics-generating unit, and the image data from said image input unit;

an image-displaying unit operable to display a blended image based on the blended image data from said image-blending unit;

a selecting unit operable to select, in response to a control signal, data from among the decoded data from said decoding unit, the graphics image data from said graphics-generating unit, and the image data from said image input unit, thereby providing selected data;

an encoding unit operable to encode the selected data from said selecting unit, thereby providing encoded data; and a storing unit operable to store the encoded data from said encoding unit, wherein said encoding unit individually encodes two or greater pieces of data selected by said selecting unit when said selecting unit selects the two or greater pieces of data.

5. Data-transceiving equipment comprising:

a received data-separating unit operable to separate received data into two different pieces of encoded data and graphics data, thereby providing the encoded data and the graphics data, when the received data includes the encoded data and the graphics data, said received data-separating unit being operable to provide the encoded data when the received data includes the encoded data, but not the graphics data;

a decoding unit operable to decode the encoded data from said received data-separating unit, thereby providing decoded data;

a graphics-generating unit operable to generate graphics image data based on the graphics data from said received data-separating unit, thereby providing the graphics image data;

an image input unit operable to enter image data;

an image-blending unit operable to blend a plurality of images with one another to provide blended image data, the plurality of images being represented by at least two pieces of data selected from among the decoded data from said decoding unit, the graphics image data from said graphics-generating unit, and the image data from said image input unit;

an image-displaying unit operable to display a blended image based on the blended image data from said image-blending unit;

a selecting unit operable to select, in response to a control signal, data from among the decoded data from said decoding unit, the graphics image data from said graphics-generating unit, and the image data from said image input unit, thereby providing selected data;

an encoding unit operable to encode the selected data from said selecting unit, thereby providing encoded data;

a multiplexing unit operable to multiplex the graphics data with the encoded data from said encoding unit upon receipt of the graphics data from said received data-separating unit, thereby providing multiplexed data;

a storing unit operable to store the multiplexed data upon receipt of the multiplexed data from said multiplexing unit, but operable to store the encoded data upon receipt of the encoded data from said encoding unit; and a stored data-separating unit operable to separate the multiplexed data from said storing unit into two different pieces of the encoded data and the graphics data, thereby providing the encoded data and the graphics data separately, wherein said encoding unit individually encodes two or greater pieces of data selected by said selecting unit when said selecting unit selects the two or greater pieces of data.

6. Data-transceiving equipment as defined in claim 5, further comprising:

a control unit, wherein, as to a graphics image, a first mode allows said storing unit to store the encoded graphics image data from said encoding unit, wherein, as to the graphics image, a second mode allows said storing unit to store the graphics data that underlies the graphics image, and wherein a switchover between the first and second modes is realized in accordance with instructions from the said control unit.

7. Data-transceiving equipment as defined in claim 6, wherein the second mode allows or disallows said receiving data-separating unit to enter the graphics data into said multiplexing unit in response to instructions from said control unit.

8. Data-transceiving equipment as defined in claim 5, further comprising:

a control unit, wherein said storing unit stores image data specified by said control unit from among the image data from said image input unit, the decoded data from said decoding unit, and graphics-related data, and wherein said storing unit stores data specified by said control unit from between the graphics image data from said graphics-generating unit and the graphics data from said received data-separating unit when said storing unit stores the graphics-related data.

9. Data-transceiving equipment as defined in claim 1, wherein said storing unit stores data related to the blended image displayed on said image-displaying unit.

10. An image processor comprising:

a received data-separating unit operable to separate received data into two different pieces of encoded data and graphics data, thereby providing the encoded data and the graphics data, when the received data includes the encoded data and the graphics data, said received data-separating unit being operable to provide the encoded data when the received data includes the encoded data, but not the graphics data;

a decoding unit operable to decode the encoded data from said received data-separating unit, thereby providing decoded data;

a graphics-generating unit operable to generate graphics image data based on the graphics data from said received data-separating unit, thereby providing the graphics image data;

an image-blending unit operable to blend a plurality of images with one another to provide blended image data, the plurality of images being represented by at least two pieces of data selected from among the decoded data from said decoding unit, the graphics image data from said graphics-generating unit, and image data from outside of said image processor;

an encoding unit operable to individually encode each of the image data from the outside of said image processor, the decoded data from said decoding unit, and the graphics image data from said graphics-generating unit; and a storing unit operable to store the encoded image data from the outside of said image processor, the encoded decoded data, and the encoded graphics image data.

11. An image processor comprising:

a received data-separating unit operable to separate received data into two different pieces of encoded data and graphics data, thereby providing the encoded data and the graphics data, when the received data includes the encoded data and the graphics data, said received data-separating unit being operable to provide the encoded data when the received data includes the encoded data, but not the graphics data;

a decoding unit operable to decode the encoded data from said received data-separating unit, thereby providing decoded data;

a graphics-generating unit operable to generate graphics image data based on the graphics data from said received data-separating unit, thereby providing the graphics image data;

an image-blending unit operable to blend a plurality of images with one another to provide blended image data, the plurality of images being represented by at least two pieces of data selected from among the decoded data from said decoding unit, the graphics image data from said graphics-generating unit, and image data from outside of said image processor;

an encoding unit operable to individually encode each of the image data from the outside of said image processor and the decoded data from said decoding unit, thereby providing encoded data;

a multiplexing unit operable to multiplex the encoded data from said encoding unit with the graphics data from said received data-separating unit, thereby providing multiplexed data;

a storing unit operable to store the multiplexed data from said multiplexing unit; and a stored data-separating unit operable to separate the multiplexed data from said storing unit into two different pieces of the encoded data and the graphics data, thereby providing the encoded data and the graphics data separately.

12. An image processor comprising:

a received data-separating unit operable to separate received data into two different pieces of encoded data and graphics data, thereby providing the encoded data and the graphics data, when the received data includes the encoded data and the graphics data, said received data-separating unit being operable to provide the encoded data when the received data includes the encoded data, but not the graphics data;

a decoding unit operable to decode the encoded data from said received data-separating unit, thereby providing decoded data;

a graphics-generating unit operable to generate graphics image data based on the graphics data from said received data-separating unit, thereby providing the graphics image data;

an image-blending unit operable to blend a plurality of images with one another to provide blended image data, the plurality of images being represented by at least two pieces of data selected from among the decoded data from said decoding unit, the graphics image data from said graphics-generating unit, and image data from outside of said image processor;

a selecting unit operable to select, in response to a control signal, data from among the decoded data from said decoding unit, the graphics image data from said graphics-generating unit, and the image data from the outside of said image processor, thereby providing selected data;

an encoding unit operable to encode the selected data from said selecting unit, thereby providing encoded data; and a storing unit operable to store the encoded data from said encoding unit, wherein said encoding unit individually encodes two or greater pieces of data selected by said selecting unit when said selecting unit selects the two or greater pieces of data.

13. An image processor:

a received data-separating unit operable to separate received data into two different pieces of encoded data and graphics data, thereby providing the encoded data and the graphics data, when the received data includes the encoded data and the graphics data, said received data-separating unit being operable to provide the encoded data when the received data includes the encoded data, but not the graphics data;

a decoding unit operable to decode the encoded data from said received data-separating unit, thereby providing decoded data;

a graphics-generating unit operable to generate graphics image data based on the graphics data from said received data-separating unit, thereby providing the graphics image data;

an image-blending unit operable to blend a plurality of images with one another to provide blended image data, the plurality of images being represented by at least two pieces of data selected from among the decoded data from said decoding unit, the graphics image data from said graphics-generating unit, and image data from outside of said image processor;

a selecting unit operable to select, in response to a control signal, data from among the decoded data from said decoding unit, the graphics image data from said graphics-generating unit, and the image data from the outside of said image processor, thereby providing selected data;

an encoding unit operable to encode the selected data from said selecting unit, thereby providing encoded data;

a multiplexing unit operable to multiplex the graphics data with the encoded data from said encoding unit upon receipt of the graphics data from said received data-separating unit, thereby providing multiplexed data;

a storing unit operable to store the multiplexed data upon receipt of the multiplexed data from said multiplexing unit, but operable to store the encoded data upon receipt of the encoded data from said encoding unit; and a stored data-separating unit operable to separate the multiplexed data from said storing unit into two different pieces of the encoded data and the graphics data, thereby providing the encoded data and the graphics data separately, wherein said encoding unit individually encodes two or greater pieces of data selected by said selecting unit when said selecting unit selects the two or greater pieces of data.

* * * * *

UNITED STATES PATENT AND TRADEMARK OFFICE
CERTIFICATE OF CORRECTION

PATENT NO. : 7,599,563 B2  
APPLICATION NO. : 10/541371  
DATED : October 6, 2009  
INVENTOR(S) : Hoshino et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 884 days.

Signed and Sealed this

Twenty-eighth Day of September, 2010

David J. Kappos  
*Director of the United States Patent and Trademark Office*